United States Patent
Yi et al.

(10) Patent No.: US 10,389,501 B2
(45) Date of Patent: Aug. 20, 2019

(54) METHOD AND APPARATUS FOR UTILIZING 5G SPECTRUM AND FRAME STRUCTURE IN WIRELESS COMMUNICATION SYSTEM

(71) Applicant: LG ELECTRONICS INC., Seoul (KR)

(72) Inventors: Yunjung Yi, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 15/459,802

(22) Filed: Mar. 15, 2017

(65) Prior Publication Data

US 2017/0272221 A1 Sep. 21, 2017

Related U.S. Application Data

(60) Provisional application No. 62/309,438, filed on Mar. 16, 2016.

(51) Int. Cl.
| | |
|---|---|
| *H04L 5/00* | (2006.01) |
| *H04W 72/04* | (2009.01) |
| *H04W 88/02* | (2009.01) |
| *H04W 88/08* | (2009.01) |

(52) U.S. Cl.
CPC ....... *H04L 5/0048* (2013.01); *H04W 72/0446* (2013.01); *H04W 88/02* (2013.01); *H04W 88/08* (2013.01)

(58) Field of Classification Search
CPC .......... H04L 5/0048; H04W 72/0446; H04W 88/02; H04W 88/08
See application file for complete search history.

(56) References Cited

U.S. PATENT DOCUMENTS

| | | | |
|---|---|---|---|
| 2010/0216467 A1* | 8/2010 | Ryan ..................... | H04W 24/04 455/435.1 |
| 2013/0077582 A1* | 3/2013 | Kim ..................... | H04W 74/006 370/329 |
| 2013/0178220 A1* | 7/2013 | Lee ........................ | H04L 5/0007 455/450 |
| 2016/0249224 A1* | 8/2016 | Prasad .................. | H04W 16/14 |
| 2016/0337994 A1* | 11/2016 | Han ....................... | H04W 56/00 |
| 2017/0265156 A1* | 9/2017 | Xue ...................... | H04W 56/001 |
| 2018/0254853 A1* | 9/2018 | Jung ..................... | H04L 1/0038 |

* cited by examiner

*Primary Examiner* — Luat Phung
(74) *Attorney, Agent, or Firm* — Birch, Stewart, Kolasch & Birch, LLP

(57) ABSTRACT

A base station (BS) configures a first set of subframes, whose type is fixed among a plurality of cells, and a second set of subframes in a radio frame. The plurality of cells may belongs to different operators, and the different operators may be synchronized with each other. The first set of subframes may be intended subframes. The BS communicates with a user equipment (UE) by using at least one of the first set of subframes and the second set of subframes.

14 Claims, 15 Drawing Sheets

METHOD AND APPARATUS FOR UTILIZING 5G SPECTRUM AND FRAME STRUCTURE IN WIRELESS COMMUNICATION SYSTEM

CROSS-REFERENCE TO RELATED APPLICATIONS

This application claims the benefit of U.S. Provisional Application No. 62/309,438 filed on Mar. 16, 2016, the contents of which are all hereby incorporated by reference herein in their entirety.

BACKGROUND OF THE INVENTION

Field of the Invention

The present invention relates to wireless communications, and more particularly, to a method and apparatus for utilizing 5G spectrum and frame structure in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (ULRCC) is discussed. This new technology may be called new radio access technology (RAT) for convenience.

For operating new RAT efficiently, various schemes have been discussed. Specifically, in perspective of using frequency/spectrum, some new features may need to be required. Further, new frame structure may also need to be required.

SUMMARY OF THE INVENTION

The present invention provides a method and apparatus for utilizing 5G spectrum and frame structure in a wireless communication system. The present invention discusses how to utilize spectrum efficiently with paired and unpaired spectrum.

In an aspect, a method for communicating, by a base station (BS), with a user equipment (UE) in a wireless communication system is provided. The method includes configuring a first set of subframes, whose type is fixed among a plurality of cells, and a second set of subframes in a radio frame, and communicating with the UE by using at least one of the first set of subframes and the second set of subframes.

In another aspect, a base station (BS) in a wireless communication system is provided. The BS includes a memory, a transceiver, and a processor, coupled to the memory and the transceiver, that configures a first set of subframes, whose type is fixed among a plurality of cells, and a second set of subframes in a radio frame, and controls the transceiver to communicate with a user equipment (UE) by using at least one of the first set of subframes and the second set of subframes.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
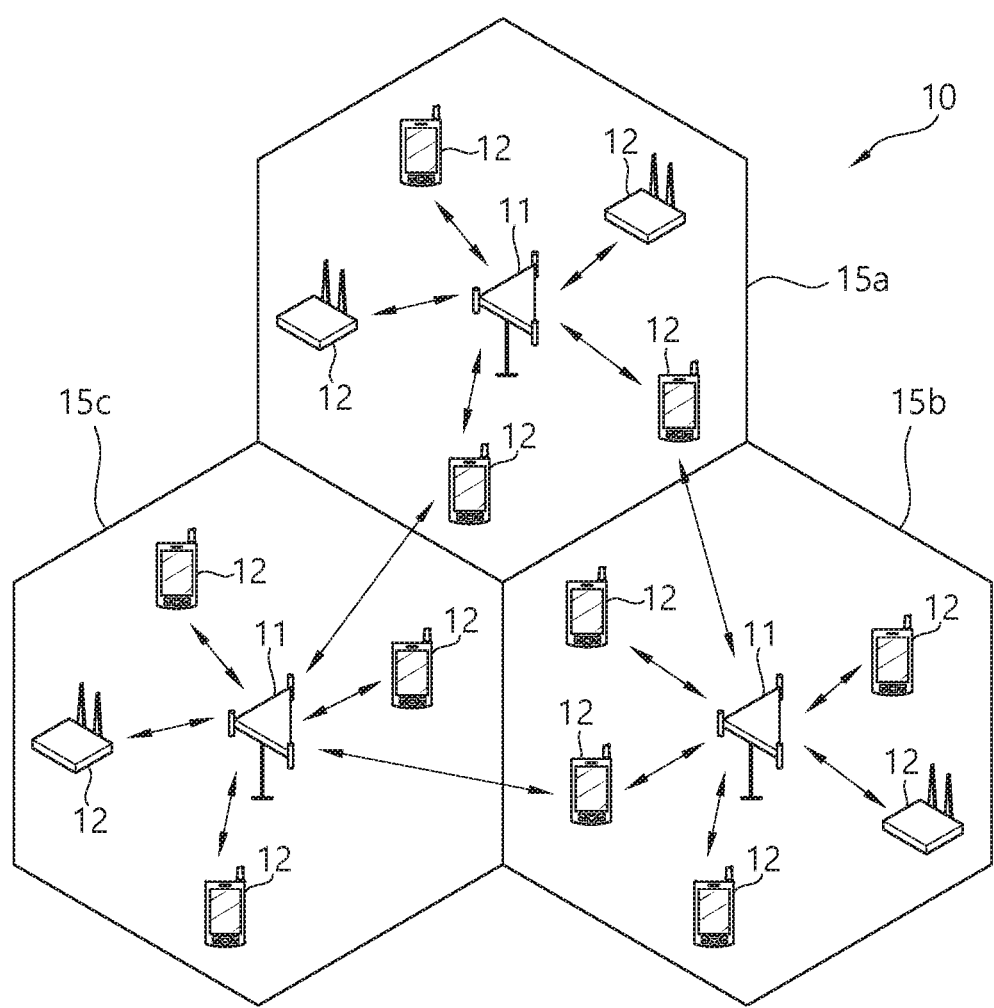
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
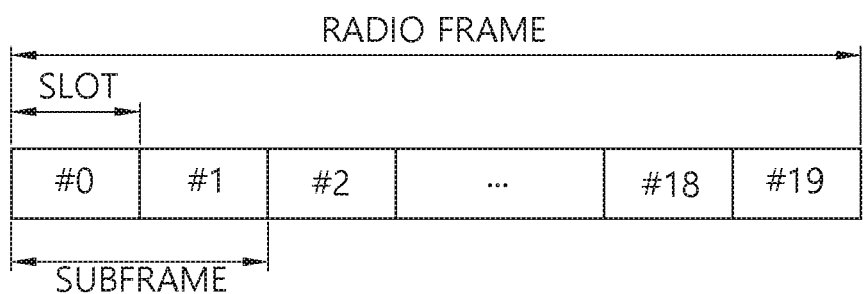
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
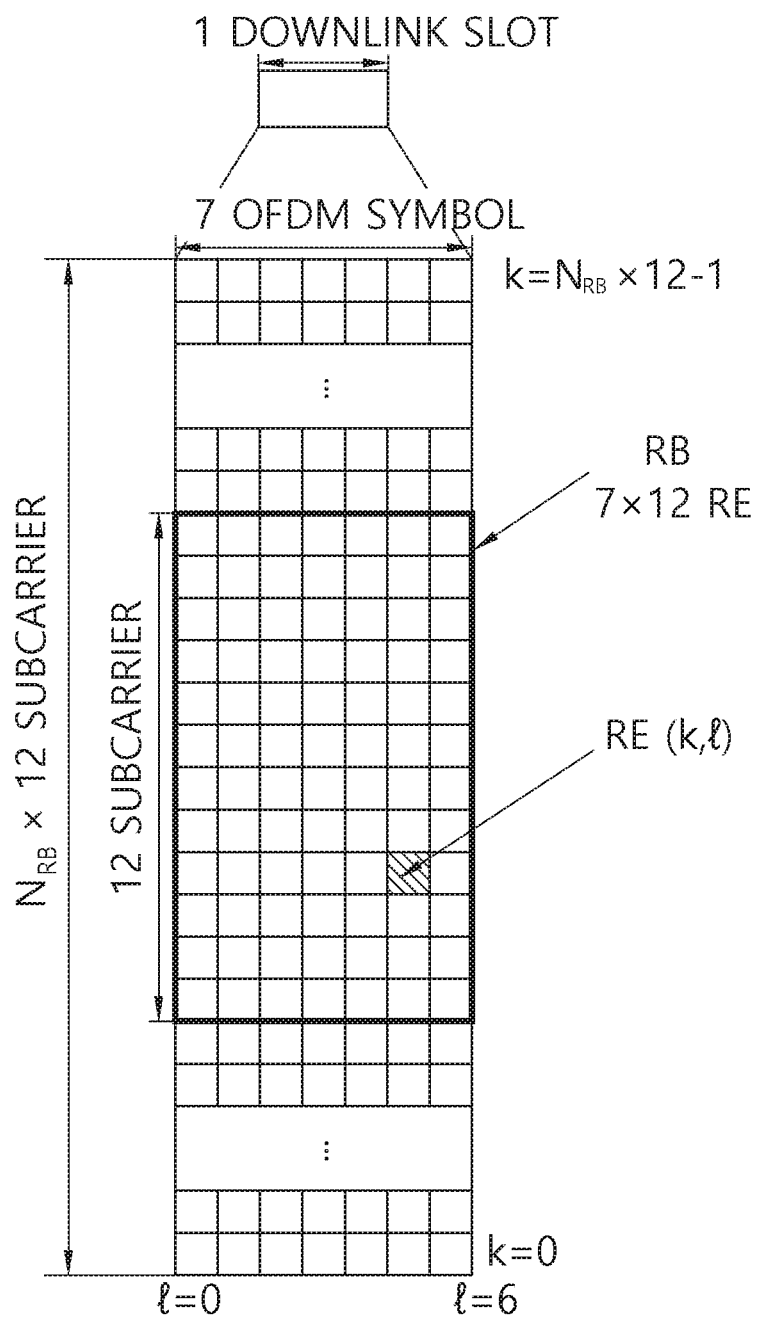
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, and 2048 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things. Hereinafter, 5G technology may be referred to as new radio access technology (RAT).

In 5G, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE.

In the unpaired spectrum, communication, such as DL, UL, device-to-device communication, and/or relay communication, may be performed in the unpaired spectrum.

Further in 5G, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 4:
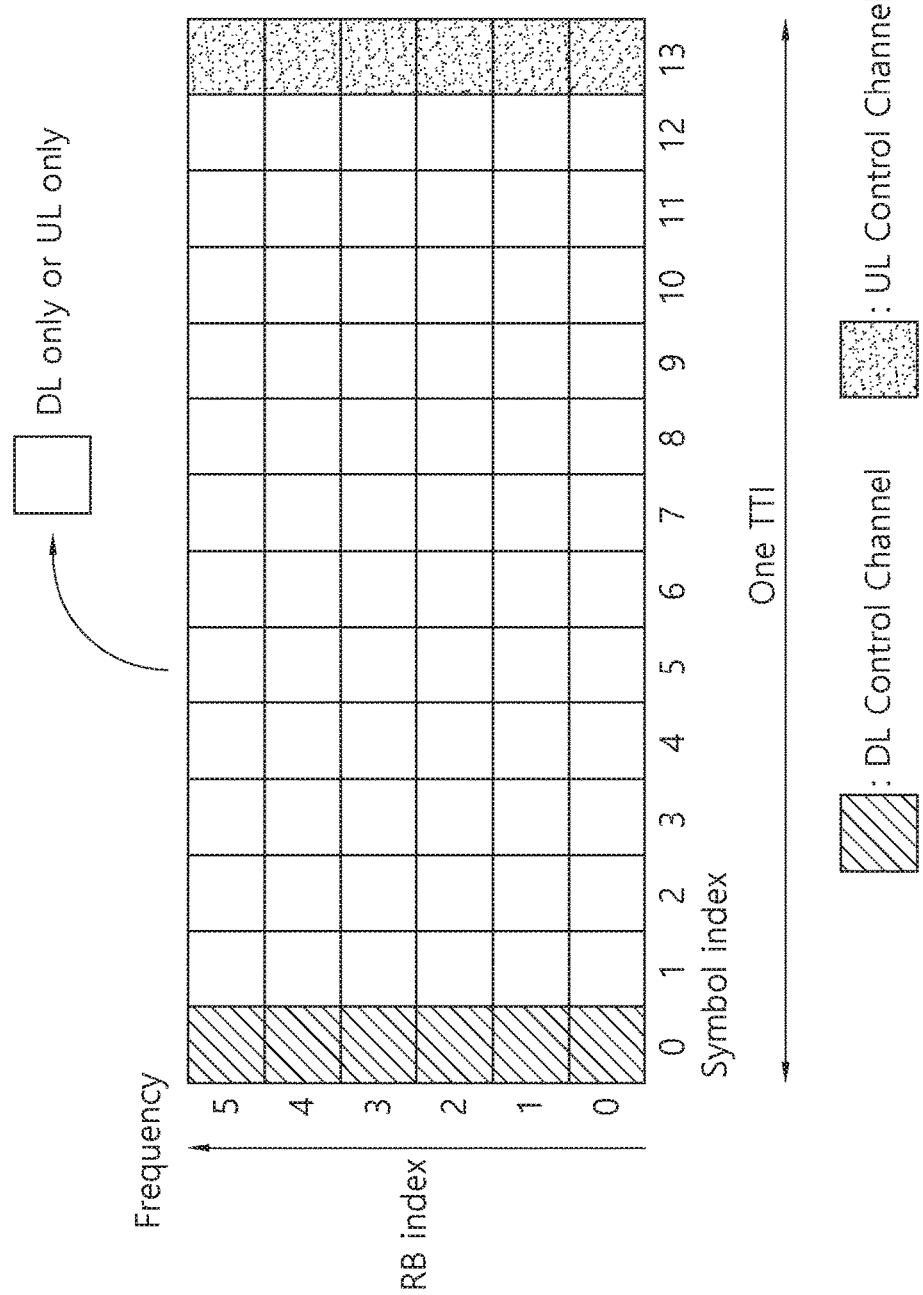
FIG. 4 shows an example of subframe type according to an embodiment of the present invention.

FIG. 4 shows an example of subframe type according to an embodiment of the present invention. The subframe shown in FIG. 4 may be used in TDD system of 5G, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

To be more generic, the subframe types may listed as follows in Table 1.

TABLE 1

| Configurations | Symbol index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | Dc | Dd | Dd | Dd | Dd | Dd | Dd | Dd | Dd | Dd | Dd | Dd | Dd CSI-RS | Dd CSI-RS |
| 1 | Dc | Dd | Dd | Dd | Dd | Dd | Dd | Dd | Dd | Dd | Dd | Dd | GP | Uc SRS |
| 2 | Dc | Dc | Dd | Dd | Dd | Dd | Dd | Dd | Dd | Dd | Dd | Dd | Dd CSI-RS | Dd CSI-RS |
| 3 | Dc | Dc | Dd | Dd | Dd | Dd | Dd | Dd | Dd | Dd | Dd | Dd | GP | Uc SRS |
| 4 | Dc | GP | Ud | Ud | Ud | Ud | Ud | Ud | Ud | Ud | Ud | Ud | Ud | Ud |
| 5 | Dc | GP | Ud | Ud | Ud | Ud | Ud | Ud | Ud | Ud | Ud | Ud | Ud | Uc SRS |
| 6 | Dc | GP | Ud | Ud | Ud | Ud | Ud | Ud | Ud | Ud | Ud | Ud | Ud | CSI-RS |
| 7 | Dc | GP | Ud | Ud | Ud | Ud | Ud | Ud | Ud | Ud | Ud | Ud | SRS | CSI-RS |
| 8 | Dc | GP | Ud | Ud | Ud | Ud | Ud | Ud | Ud | Ud | Ud | Ud | SRS | Uc |
| . . . | | | | | | | | | | | | | | |

In Table 1, "DC" means DL control region, "UL" means UL control region, "Dd" means DL including control and data transmission, and "Ud" means UL including control and data transmission. "GP" means guard period, "CSI-RS" means a channel state information reference signal, "SRS" means a sounding reference signal. Subframe type shown in FIG. 4 may correspond to configuration 1 in Table 1.

In general, the subframe types may be represented as follows.

(1) DX . . . XU
(2) UX . . . XD
(3) UX . . . XU
(4) DX . . . XD

In other words, combination of U and/or D including control and data may form a subframe type. The subframe type may include D only subframe and/or U only subframe.

To utilize paired spectrum and/or unpaired spectrum, the present invention discusses two cases, one of which is spectrum below 6 GHz, and the other is spectrum above 6 GHz.

1. Subframe Type Configuration for a Carrier in Below 6 GHz

That a carrier is in below 6 GHz means that macro coverage may be provided by below 6 GHz. Thus, generally higher power eNB, compared to UE, may be assumed and very efficient cell management/partitioning may be necessary. In that sense, in the carrier in 6 GHz, the paired spectrum in which one carrier is used mainly by eNB transmission towards UE and the other carrier is used mainly by UE towards eNB may be used. This may be constrained as follows for the paired spectrum.

(1) One carrier in the paired spectrum which may be potentially adjacent to any FDD DL carrier of the current system (e.g. LTE) may be configured with a subframe type of "D . . . D" (e.g. DcDdDd . . . Dd). The other carrier in the paired spectrum which may be potentially adjacent to any FDD UL carrier of the current system may be configured with a subframe of "U . . . U" (e.g. UdUd . . . Uc).

(2) Alternatively, one carrier in the paired spectrum which may be potentially adjacent to any FDD DL carrier of the current system (e.g. LTE) may be configured with a subframe type of "D . . . D" (e.g. DcDdDd . . . Dd). The other carrier in the paired spectrum which may be potentially adjacent to any FDD UL carrier of the current system may be configured with any subframe type such as "DdDd . . . Uc" or "U . . . U". Specifically, DL control may not be configured to the carrier which may be potentially adjacent to UL carrier of the current system. Alternatively, with properly reduced DL power, any subframe type may be used in the carrier.

(3) Alternatively, full flexibility may be allowed in both carrier in the paired spectrum. Or, for the performance/potential interference, Uc may be restricted in adjacent to DL carrier of the current system, and Dc may be restricted in adjacent to UL carrier of the current system. This option may be considered as two self-contained unpaired spectrum case which are deployed for two frequencies of paired spectrum.

(4) Alternatively, any subframe type which spans over two carriers may be configured.

Figure 5:
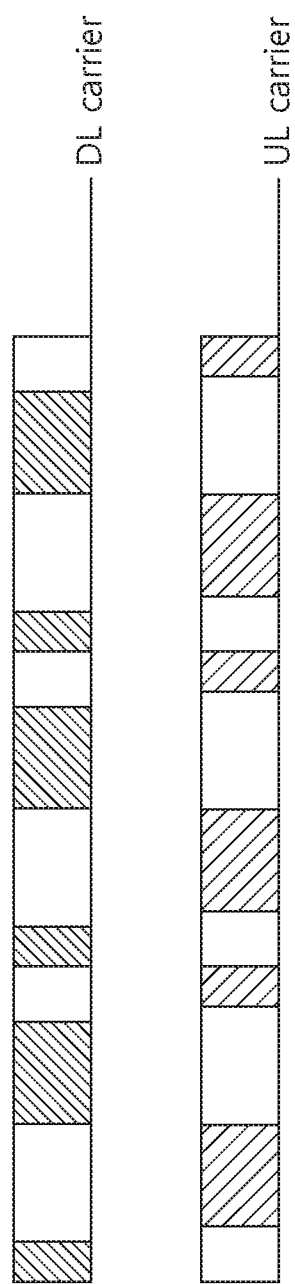
FIG. 5 shows an example of subframe type configuration in a paired spectrum according to an embodiment of the present invention.

FIG. 5 shows an example of subframe type configuration in a paired spectrum according to an embodiment of the present invention. Referring to FIG. 5, different carriers in the paired spectrum may consist of different subframe types. For example, in FIG. 5, DL carrier consists of only DL subframe, and UL carrier consists of only UL subframe. This option is similar to option (1) described above. However, from a UE perspective, one carrier spans over two different frequencies. To fully utilize the paired spectrum, the network may configure two carriers which can support different UEs.

(5) Alternatively, a carrier adjacent to DL carrier of the current system may be defined as a supplemental DL carrier. The supplemental DL carrier may be configured as unpaired TDD spectrum or unpaired FDD spectrum. The other carrier adjacent to UL carrier of the current system may be used with any subframe type (i.e. unpaired 5G duplex mode).

Hereinafter, the listed options of subframe type configurations, and its usage are further described according to the present invention, based on the network deployment options, such as paired/unpaired spectrum, synchronized or not, etc.

A. Paired Spectrum & Unsynchronized Operators

When the paired spectrums is allocated for 5G operators, it may be necessary to divide frequencies for different operators. In this case, different operators may not be synchronized each other, and thus, real-time interference coordination is very difficult. Each operator may perform DL and UL transmission in asynchronous manner. Since they are not synchronized with each other and may not be able to coordinate real-time, it is necessary to allow sufficient gap between DL and UL transmission in order to reduce interference. As typically used for FDD or TDD, two mechanisms may be considered, one of which is configuring separate DL carrier and UL carrier, and the other is configuring gap in either frequency wherever potentially DL carrier of one operator and UL carrier of another operator is adjacent.

Figure 6:
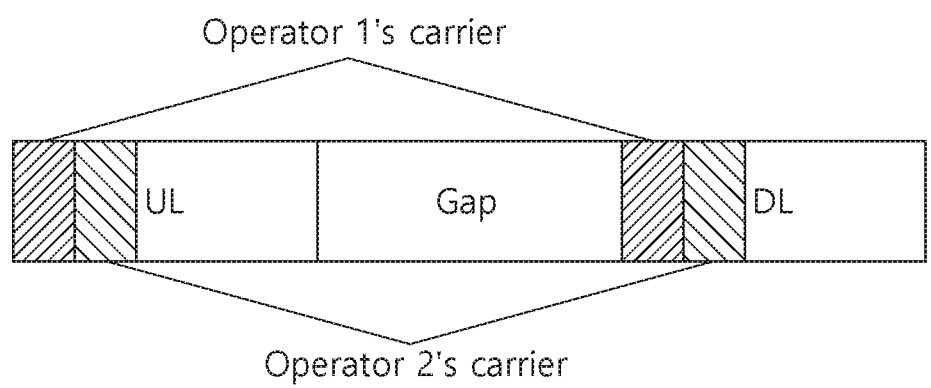
FIG. 6 shows an example of carrier configuration in paired spectrum & unsynchronized operators according to an embodiment of the present invention.

FIG. 6 shows an example of carrier configuration in paired spectrum & unsynchronized operators according to an embodiment of the present invention. Assuming frequency division manner is used among different operators, each operator may use DL and UL spectrum, respectively. Referring to FIG. 6, operator 1 and operator 2 use different DL carriers and UL carriers, respectively. Further, gap is configured between UL carrier of operator 2 and DL carrier of operator 1.

When each operator which are unsynchronized uses DL and UL spectrum in the paired spectrum, respectively, subframe type or frame structure may be configured according to at least one of the following options and considering a UE capability. As mentioned above, configuration of different subframe type may have multiple options.

(1) The subframe type may be spread over DL carrier and UL carrier. One UE may support half-duplex (HD) FDD or full-duplex (FD) FDD manner in terms of accessing DL and UL. For example, D portion may be transmitted in DL carrier and U portion may be transmitted in UL carrier. The gap may be necessary if a UE is capable of HD-FDD and may not be necessary if the UE is capable FD-FDD. In other words, the gap may be UE-specific depending on its capability.

(2) When a UE is capable HD-FDD, self-contained subframe type may be used in FDM manner and TDM manner, and gap may be inserted between DL and UL. Gap between UL to DL may not be necessary if UL timing advance is used or some other means are used to absorb the switching latency. When a UE is capable FD-FDD, the FDD frame structure of the current LTE system may be used. The FDD frame structure of the current LTE system may be viewed as configuring D only in DL carrier and U only in UL carrier by selecting appropriate subframe type.

(3) From a UE perspective, half-duplex UE may be a default UE capability. In other words, the capability of supporting one carrier or supporting either DL or UL at a time may be a default behavior. To utilize the paired spectrum, the UE may switch DL and UL frequency. Overall, this may be also applied to the unpaired spectrum. When multiple paired spectrums are available, a UE may switch from one paired spectrum to another paired spectrum by either semi-static or dynamic configuration. For example, the UE may receive UL grant from one carrier in the paired spectrum and transmit PUSCH in another carrier in the paired spectrum. To support this, a UE may be configured with multiple candidate DL and UL carriers for data. Further, a UE may be configured with separate or same DL and UL carrier for control.

Figure 7:
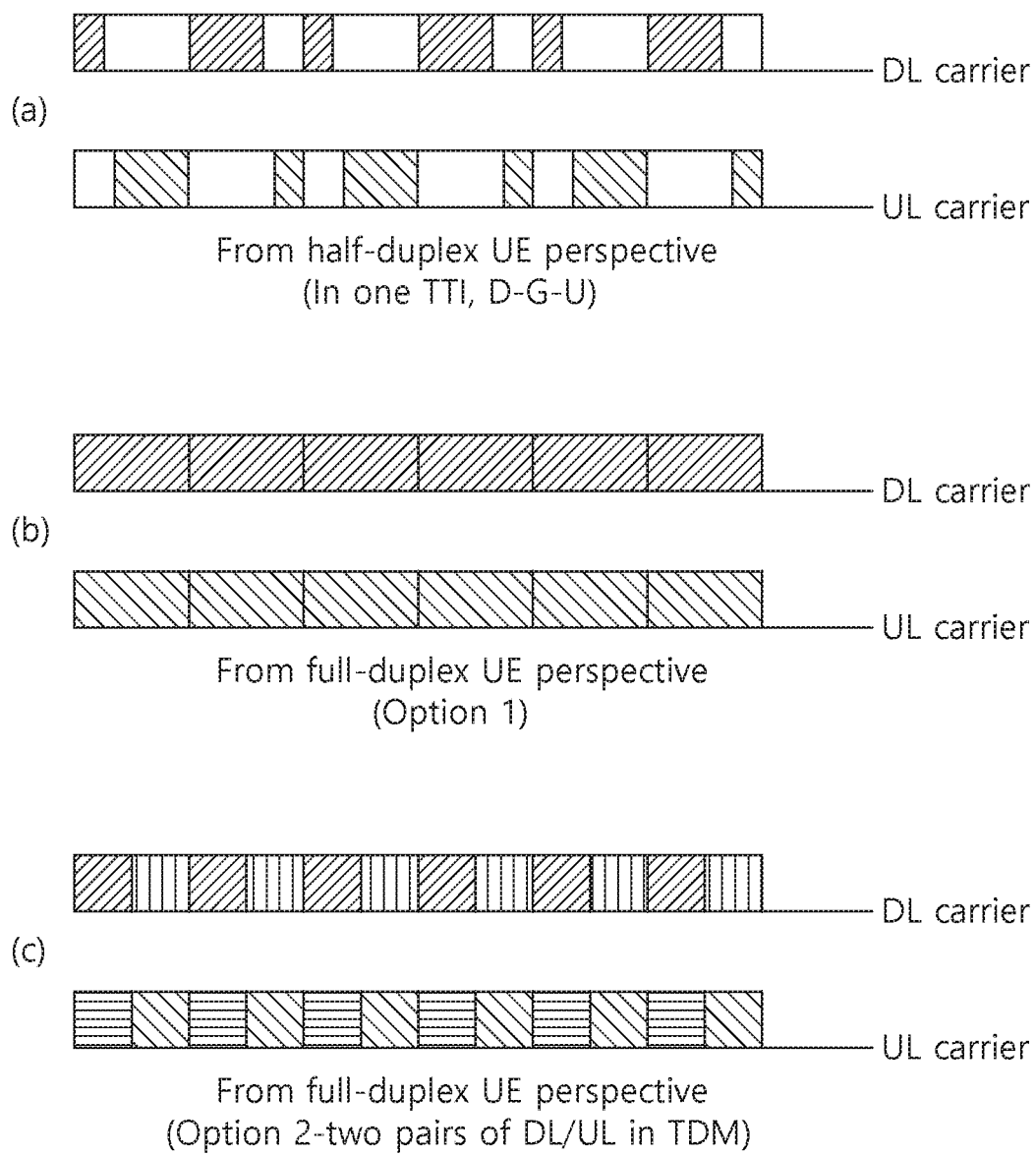
FIG. 7 shows an example of subframe type configuration in paired spectrum & unsynchronized operators according to an embodiment of the present invention.

FIG. 7 shows an example of subframe type configuration in paired spectrum & unsynchronized operators according to an embodiment of the present invention. FIG. 7-(a) corresponds to a case (1) described above, i.e. D portion may be transmitted in DL carrier and U portion may be transmitted in UL carrier, for HD-FDD UE. FIG. 7-(b) corresponds to a case (2) described above, i.e. self-contained subframe type may be used for FD-FDD UE. The subframe type configuration of FIG. 7-(b) is the same as the FDD frame structure of the current LTE system. FIG. 7-(b) corresponds to a case (3) described above, i.e. multiple paired spectrums are available.

Figure 8:
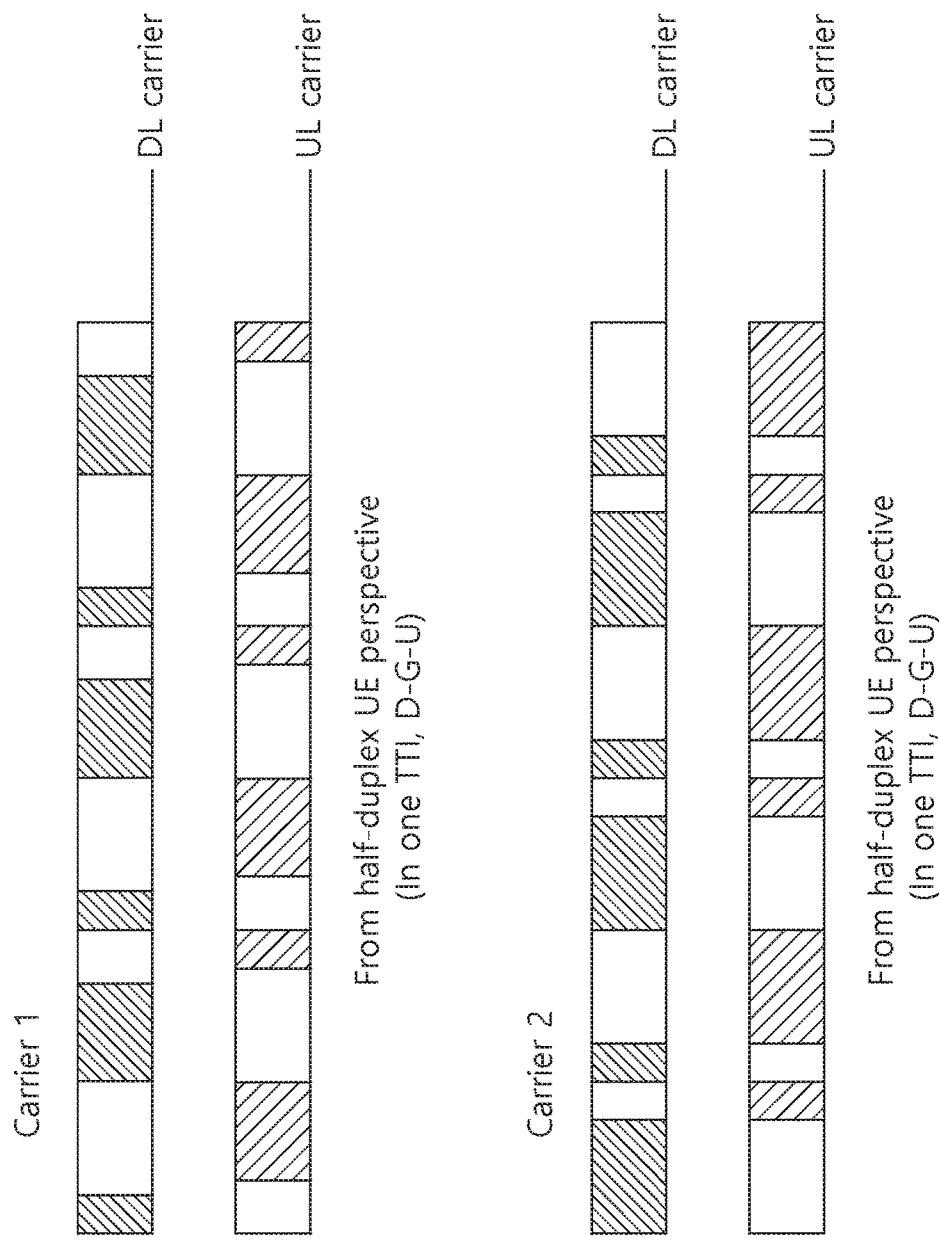
FIG. 8 shows another example of subframe type configuration in paired spectrum & unsynchronized operators according to an embodiment of the present invention.

FIG. 8 shows another example of subframe type configuration in paired spectrum & unsynchronized operators according to an embodiment of the present invention. When multiple paired spectrums are available according to case (3) described above, from the network perspective, to utilize the paired spectrum fully, multiple carriers may be formed and each carrier may be associated with different UEs. Among carriers, timing may be aligned or shifted. In other words, different subframe alignment may be used for different UEs by staggering manner. Referring to FIG. 8, the subframe type configurations in carrier 1 and carrier 2 are alternated with each other. When timing is aligned, if all subframe have DL and UL subframes, there may be portions not used for either DL or UL.

B. Unpaired Spectrum & Unsynchronized Operators

The subframe type configurations mentioned above is rather TDM manner of multiplexing. When the DL power is expected to be generally higher than the UL power, and proper cell planning is assumed, similar to current/previous technologies, it is better to align DL and UL in time domain. When synchronization is not expected, the coordination becomes challenging. Thus, in this case, at least one of the following options may be considered.

(1) "D" only subframe types may always be used in the unpaired spectrum, if synchronization is not achieved among different operators.

(2) If the unpaired spectrum is categorized as DL carrier, "D" only subframe type may be used. If the unpaired spectrum is categorized as UL carrier, "U" only subframe type may be used.

(3) Any subframe type may be used. Unless otherwise indicated, the unpaired spectrum may be assumed as DL preferable carrier, and UL transmission may guarantee no harm to the adjacent carriers. For this, UL bandwidth may be restricted by applying the gap in the edge of system bandwidth. Further, UL power control may also be assumed to minimize the interference.

(4) Duty cycling may be used. Unless otherwise indicated, the unpaired spectrum may be assumed as DL preferable carrier, and UL transmission may be done with minimal impact on adjacent carriers. For this, duty cycling may be applied, and accordingly, the UL portion of the carrier may be restricted to a certain level (e.g. 5% of the total time). In terms of utilizing duty cycle, the maximum duration of continuous UL portion may be restricted less than, e.g. one TTI, and the duty cycle may be applied or should be reset in every radio frame or a time unit. In other words, UL portion may not exceed x % of the time unit, e.g. radio frame. This implies that potential interference from UL transmission to DL transmission on adjacent carrier may occur. However, the interference level may be limited by the duty cycle or the percentage of allowed UL transmission. When duty cycle is used, to protect interference on DL control channels, DL control channels may be placed on rather center of the system bandwidth, which may minimize the impact from adjacent UL transmission. The same technique may be applied to paired DL carrier and paired UL carrier. In case of paired UL carrier, the duty cycle may be applied to DL transmission rather than UL transmission.

C. Unpaired Spectrum & Synchronized Operators

When unpaired spectrum is used for multiple operators and the multiple operators are synchronized with each other, at least one of the following options may be considered.

(1) The same subframe type may be used in each subframe among different operators. In other words, subframe type configuration over, e.g. a radio frame, may be common among different operators. The subframe type configuration in each subframe may be signaled via system information or physical broadcast channel (PBCH). This is similar to TDD DL/UL configuration information in the current LTE system. Each cell may broadcast the subframe type configuration in each subframe over a radio frame (or a superframe). By some coordination or negotiation, subframe type the configuration may be common among different operators. Various subframe types may be considered to allow different DL and UL portions. However, this approach may restrict flexibility.

(2) Alternatively, instead of setting the same subframe type configuration in each subframe among different operators, some subframes among a radio frame (or a superframe) may be restricted with the same subframe type, and dynamic adaptation of subframe type configuration may be allowed in other subframes. For example, if a radio frame consists of 10 subframes, subframe #0, #4, #5, #9 may be fixed with fixed subframe type among different operators. The fixed subframe type may be indicated by the cell via PBCH or system information, similar to TDD DL/UL configuration. The motivation of assigning the fixed subframe type is to guarantee minimal performance impact, and to place some important messages or allow UE measurements such as radio link failure, reference signal received power (RSRP)/reference signal received quality (RSRQ), etc., on those subframes assigned by the fixed subframe type. In other subframes, each cell may select any subframe type. However, each cell may exchange the intended subframe type of those subframes among neighbor cells/adjacent carrier cells to minimize the interference. In flexible subframes, the network may place UL control and DL control near the center frequency to minimize interference from adjacent carriers. For neighbor cells belonging to the same operator or operating in the same frequency, the cell may coordinate or align its dynamic configuration or apply different configuration only if interference is not harmful to the neighbor cells (similar to enhanced interference mitigation and traffic adaptation (eIMTA) inter-cell interference coordination (ICIC) techniques).

(3) Alternatively, the second option described above may be expanded to the entire subframes. That is, any subframe type may be assigned to each subframe. Even in this case, some guarantee of DL portion to transmit such as synchronization signals, measurement reference signals, radio link failure mechanism may be necessary.

1. Inter-Operator Spectrum Coordination for Above 6 GHz

One of main difference of above 6 GHz frequency spectrum from below 6 GHz frequency is that a cell may perform transmission and/or reception with analog beam forming. While the cell supports different beam direction than a UE supports, the UE may not be supported either DL or UL. In order to avoid this problem, semi-static partitioning among possible analog beams may be used. This may be effective when there are UEs uniformly distributed in each beam direction and UEs have restricted baseband capability. For example, if the network has M MHz system bandwidth in K OFDM symbols (one TTI), and performs analog beam forming in one OFDM symbol level, in terms of UE capability, two alternative approaches may be considered. First, a UE may process M MHz system bandwidth (or maximum T transport block size (TBS)) in one OFDM symbol. This approach requires high processing power at the UE as data transmitted over M MHz in OFDM symbol may be large and a UE may not be scheduled with each OFDM symbol in one TTI due to antenna beam switching. Alternatively, a UE may process M MHz system bandwidth (or maximum T TBS) in one TTI. This approach may relax UE processing burden. However, this approach restricts the network scheduling flexibility such that interval between two consecutive data transmission to the same UE should be larger than one TTI size. However, if the network wants to schedule more frequently, it may reduce the overall TBS in each scheduling and the sum of scheduled TBS over one TTI may be less than T.

Hereinafter, some possible TDM approaches will be described assuming that the second approach is adopted. DL carrier and/or UL carrier may be further divided to more than one DL portion in TDM manner. In this case, the UE capability may also include how many sub-TTIs may be processed within one TTI. Or, generally, it may be represented as maximum TBS "T" which may be processed in one OFDM symbol or DL symbol or minimum unit of scheduling. In other words, a UE may indicate its baseband processing capability (for one coder) which may represent maximum TBS "T" per minimum scheduling unit or processing delay to process preconfigured maximum TBS T. If carriers are operating in different minimum scheduling unit, the minimum scheduling unit among all carriers supported by the network may be used or separate processing capability signaling per carrier may be used. For example, one subframe may be divided to four sub-TTIs and a UE capability may indicate the processing capability from 1 to 4. If a UE reports 4, it may imply that a UE can receive data continuously from all sub-TTIs in one TTI, and thus, processing latency of data is 1 sub-TTI. When a UE reports 1, it may imply that the UE can receive only one sub-TTI in one TTI, and thus, processing latency of data is 1 TTI. This is similar to carrier aggregation, only the difference is that a UE capability is determined based on baseband processing capability only rather than based on radio frequency (RF) capability.

Figure 9:
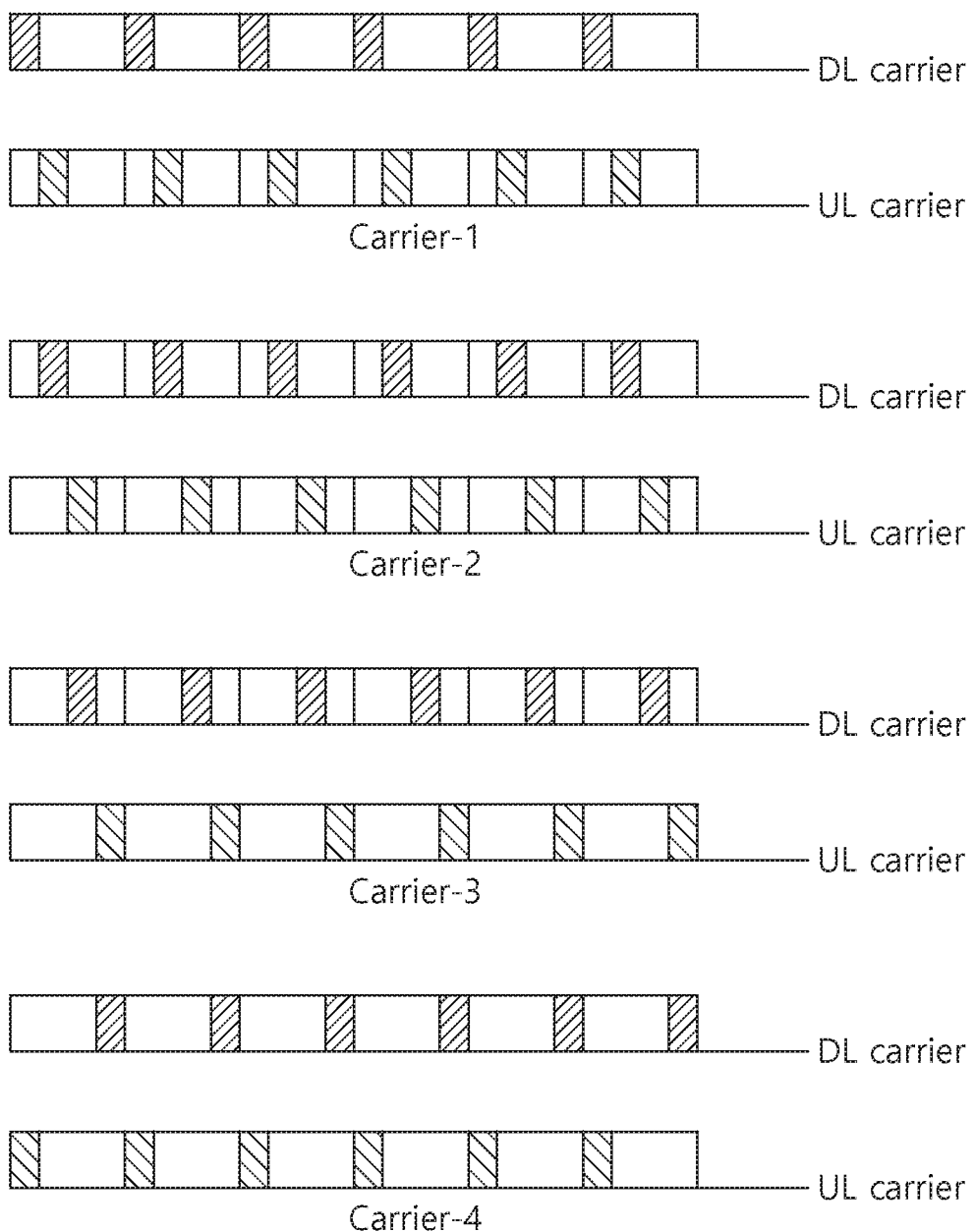
FIG. 9 shows an example of subframe type configuration in a carrier above 6 GHz according to an embodiment of the present invention.

FIG. 9 shows an example of subframe type configuration in a carrier above 6 GHz according to an embodiment of the present invention. A carrier may be divided by beam direction or just divided by time for UE multiplexing. Referring to FIG. 9, each carrier is divided by time for UE multiplexing.

If a UE can support more than one sub-TTI (which maps to the processing latency or inter-arrival time of data packet that the UE can process), a UE may receive/transmit multiple data in one TTI depending on the network schedule. For a UE supporting less than the number of sub-TTIs in a TTI, a possible sub-TTIs where a UE can be scheduled with may be fixed by cell search and/or higher layer configuration. Dynamic switching may also be considered. In essence, it may define the UE capability of processing delay. In other words, the TTI that a UE can support may be UE-specific and UE capability where the length of one data region may be fixed. For example, if a UE can support 2 sub-TTIs (i.e. processing latency is 2 sub-Ills), then the following options may be considered from the network scheduling perspective.

A UE may monitor only fixed sub-TTIs for data reception/transmission. This may be dynamically/semi-statically/implicitly determined as mentioned above.

If the network wants to schedule maximum TBS, the network may ensure that the inter-arrival time is equal or larger than the processing latency of the UE. If the network wants to schedule more frequently, it should reduce the TBS so that the maximum amount of data that a UE needs to process should not exceed maximum TBS in the processing latency capability.

In higher frequency such as 30 GHz, spatial diversity, which means further division in spatial domain, may also be e considered. Thus, to share frequency among different operators, time, frequency and spatial division, which may be different based on the degree of required synchronization among operators, may be considered.

A. Paired Spectrum & Unsynchronized Operators

Similar to below 6 GHz case, when network is not synchronized, some coordination among operators becomes challenging. In this case, techniques for paired/unpaired spectrum & unsynchronized operators in below 6 GHz describe above may be applied to this case as well. Furthermore, duty cycling to support different DL and UL among adjacent carriers may also be considered. However, interference characteristics in above 6 GHz may be different from that in below 6 GHz, assuming that the cell is very dense and the transmission power may be lower than a UE or equivalent to the UE. Furthermore, cell deployment may be rather random, and a cell may even move. Accordingly, interference between eNBs and between eNB and UE may not be so different from the characteristics perspective. In this sense, paired spectrum in high frequency may not be so effective, unless it is designed for large coverage cell. Thus, it is generally desirable to have a gap between adjacent carriers to address the overall interference.

B. Paired Spectrum & Synchronized Operators

If timing is aligned among operators, e.g. via global positioning system (GPS), spatial division or time division multiplexing may be further considered. For example, if beam direction is divided to m sectors in one TTI, each operator may take different pattern to be orthogonal.

Figure 10:
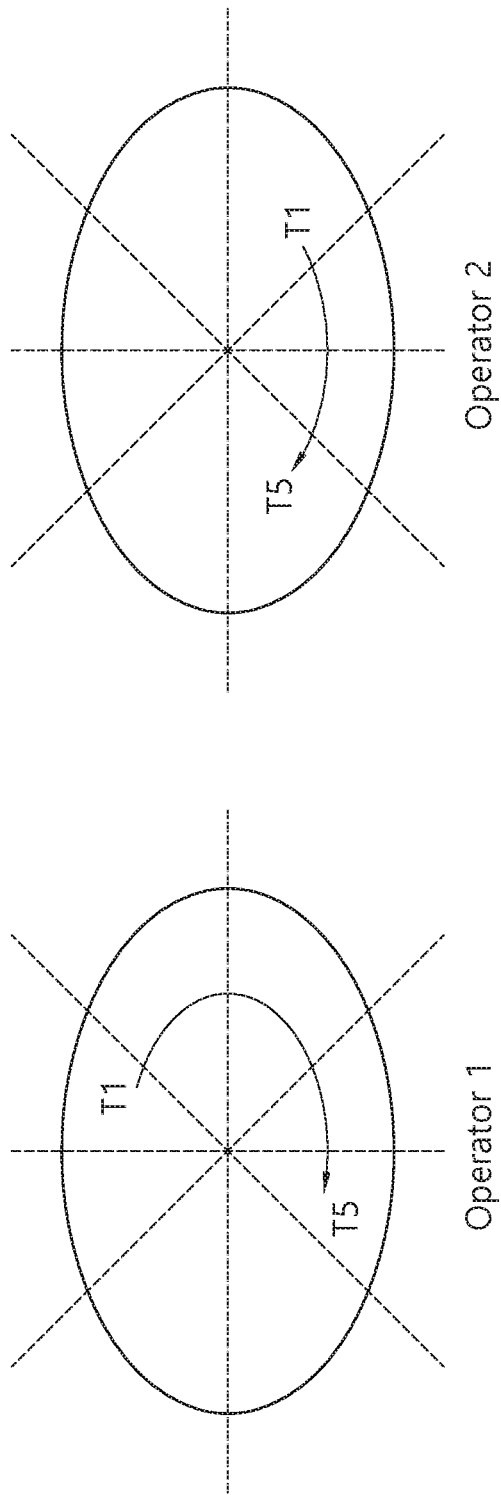
FIG. 10 shows an example of beam direction pattern of different operators in paired spectrum & synchronized operators according to an embodiment of the present invention.

FIG. 10 shows an example of beam direction pattern of different operators in paired spectrum & synchronized operators according to an embodiment of the present invention. Referring to FIG. 10, operator 1 may select beam direction pattern D1→D2→D3→D4. Operator 2 may select beam direction pattern D3→D4→D1→D2, which are orthogonal with the beam direction pattern of operator 1. This mechanism may also be used among neighbor cells to minimize interference or overlap.

Alternatively, among operators, the beam direction pattern may be prefixed and each eNB may use the same beam direction pattern in order not to cause any harm to operation of other operators. In order not to cause any configuration regardless of the location of eNB, the sectors/beam directions may be determined based on 2D absolute locations.

To allow coordination multi-point (CoMP) operation among different cells belonging to the same operator, it may be necessary to allow more than one beam direction pattern available to each operator. Among possible set of beam direction patterns, a set of beam direction patterns may be allocated to each operator, and beam direction patterns belonging to the different set may be orthogonal. Alternatively, coarse beam/sector partitioning may be used, or the network or each cell may determine its beam direction pattern based on neighbor cell's beam direction pattern. Or, the beam direction pattern may be negotiated among neighbor cells. This may be applied to both FDM and TDM manner of UL/DL operation. Thus, beam direction pattern or sector pattern may be signaled via system information or may also be negotiated among eNBs/cells via backhaul signaling.

This assumes that DL frequency is used for DL only and UL frequency is used for UL only.

C. Unpaired Spectrum & Synchronized Operators

To allow flexible use of spectrum without interference, DL and UL portion may be fixed or predefined per each carrier. In this case, multiple sets may be considered which are determined by each eNB but aligned among different operators. Alternatively, DL and UL portions may be flexible. In this case, each carrier may have orthogonal beam pattern to avoid any interference (at least among adjacent carriers).

In other words, the approaches to divide time/frequency/space & DL/UL among different operators/cells may be as follows.

Only frequency domain separation for DL/UL may be used. In this case, within each DL frequency or UL frequency, further division via TDM or SDM may be considered.

Only time domain separation for DL/UL may be used. To minimize interference among adjacent carrier, the common DL/UL pattern may be used (similar to current TDD). The common DL/UL pattern may be selected among different patterns. Adjacent carrier may use different/orthogonal beam pattern for DL and UL respectively (or jointly). In other words, each carrier may select DL and UL portion dynamically, and adjacent carrier may be separate by different beam pattern or sector patterns.

Frequency/time domain separation for DL/UL may be used.

Figure 11:
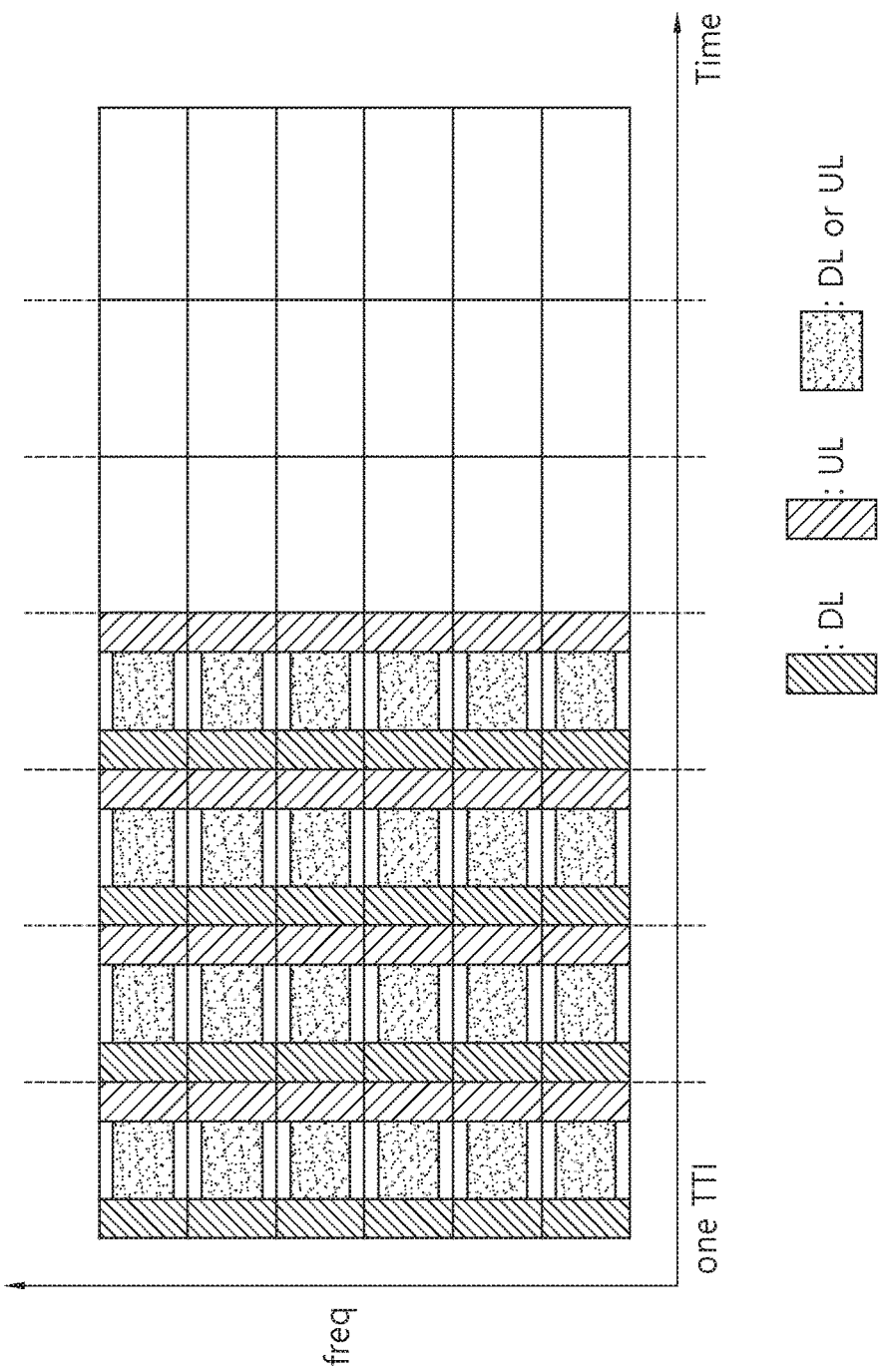
FIG. 11 shows an example of frequency/time domain separation for DL/UL according to an embodiment of the present invention.

FIG. 11 shows an example of frequency/time domain separation for DL/UL according to an embodiment of the present invention. Referring to FIG. 11, frequency/time domain separation for DL/UL is used.

If adjacent carrier is FDD or TDD carrier of the current LTE system, the gap may need to be increased.

Figure 12:
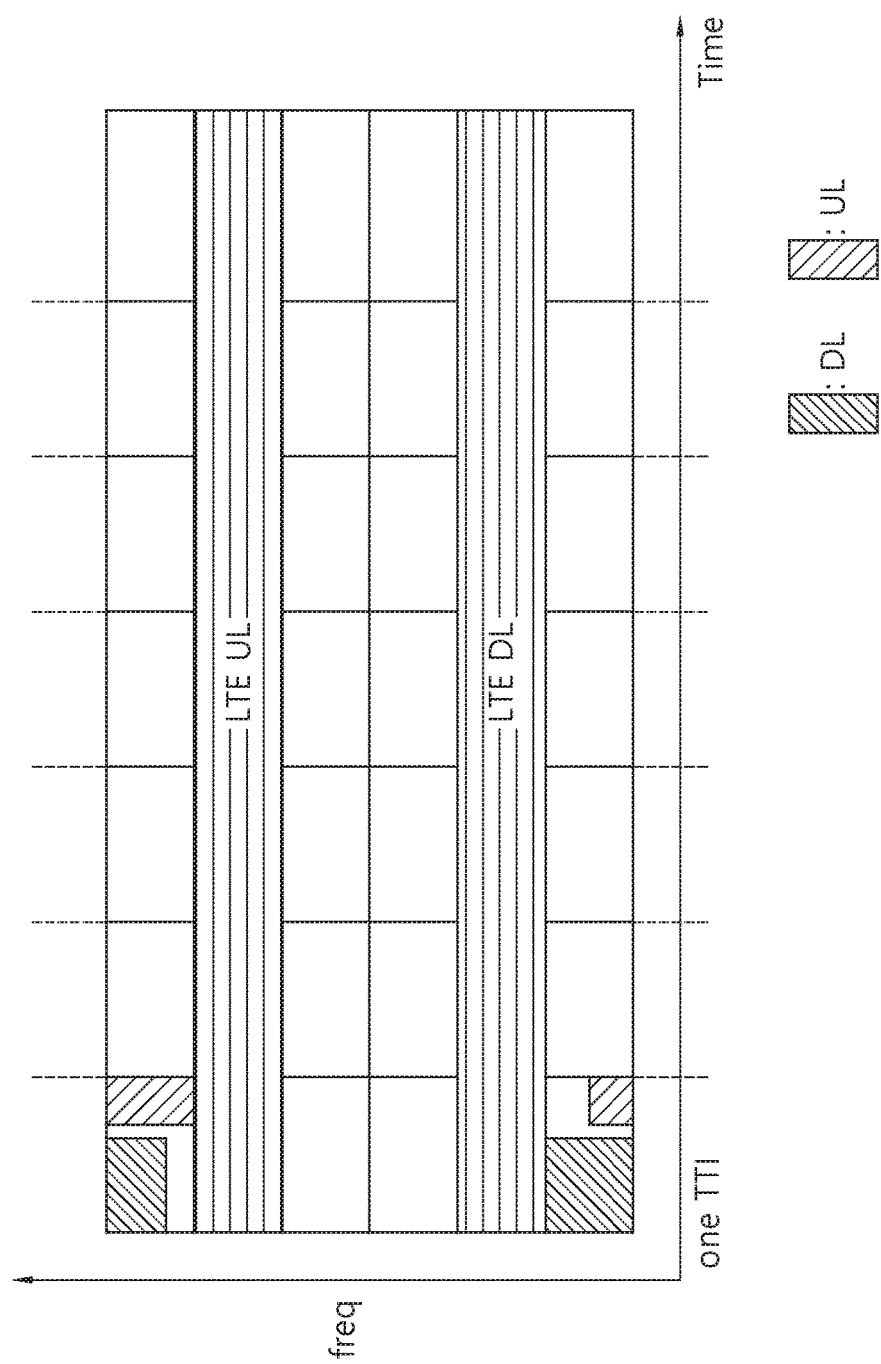
FIG. 12 shows an example of frequency/time domain separation for DL/UL according to an embodiment of the present invention.

FIG. 12 shows an example of frequency/time domain separation for DL/UL according to an embodiment of the present invention. Referring to FIG. 12, LTE UL carrier and LTE DL carrier is present as adjacent carrier. In this case, gap is increased.

3. Inter-Cell Interference Coordination Mechanism in Above 6 GHz

In higher frequency spectrum, beam forming transmission may be used to maximize efficiency. Assuming that the cells are not overlapped in the same frequency, generally, the interference to neighbor cells from UE transmission can be minimized by adjusting UE's transmission antenna beam direction.

Figure 13:
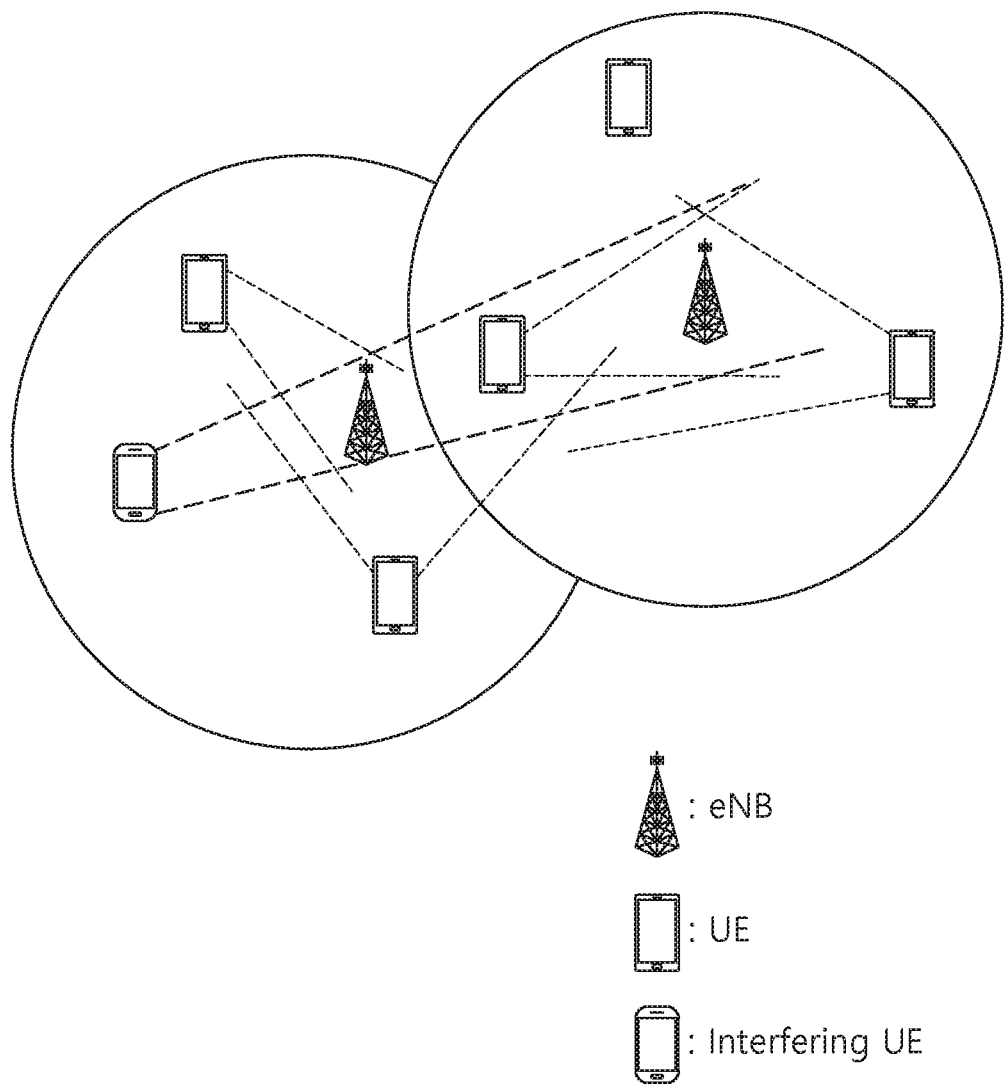
FIG. 13 shows an example of adjusting beam direction of UE according to an embodiment of the present invention.

FIG. 13 shows an example of adjusting beam direction of UE according to an embodiment of the present invention. Referring to FIG. 13, depending on UE placement and eNB placements, beam directions which may interfere neighbor cells may exist. This interfering beam direction may be measured by each eNB via beam direction reference signal (such as CSI-RS) and/or physical random access channel (PRACH) transmission of the UE and/or SRS transmission of the UE. If beam direction RS is used to measure potential interfering beam directions, some coordination to transmit the beam direction RS in different timing so that each eNB can listen each other needs to be considered. For this, synchronization signal may be transmitted in different timing based on cell ID. For example, (cell ID % 6) may determine the location of beam direction RS transmission (e.g. cell ID=0 may transmit beam direction RS in OFDM symbol 0 and 1 in each subframe where synchronization signal is transmitted). In terms of coordination of beam directions, each cell may broadcast its intended beam directions via backhaul signaling or dynamic indication in each subframe or semi-static configuration. Alternatively, power per beam direction may be reduced. In other words, either maximum power may be configured separately per beam direction or maximum power may be configured via power control. This may also be applicable to DL transmission.

Figure 14:
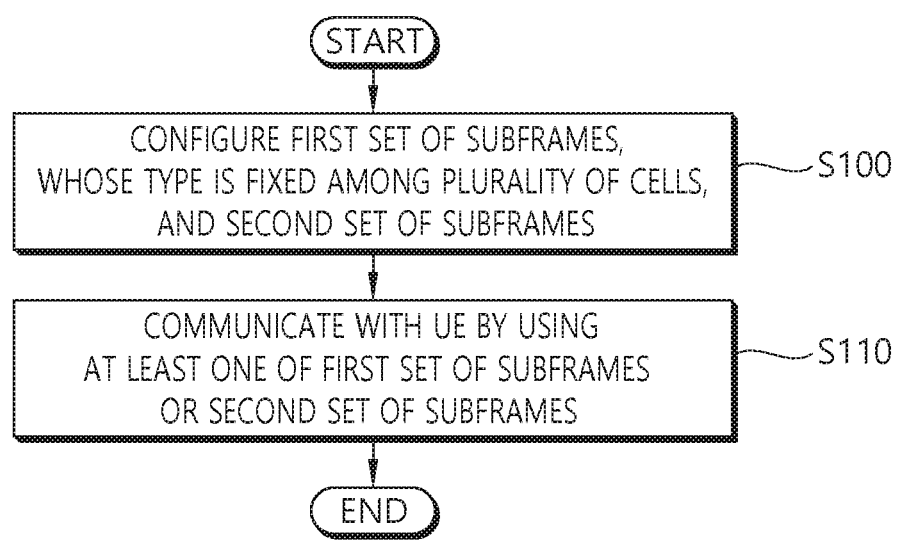
FIG. 14 shows a method for communicating, by a BS, with a UE according to an embodiment of the present invention.

FIG. 14 shows a method for communicating, by a BS, with a UE according to an embodiment of the present invention. The present invention described above may be applied to this embodiment.

In step S100, the BS configures a first set of subframes, whose type is fixed among a plurality of cells, and a second set of subframes in a radio frame. The plurality of cells may belong to different operators. The different operators may be synchronized with each other. The plurality of cells may operate in a frequency below 6 GHz or above 6 GHz. The first set of subframes may be indicated via system information or PBCH. The radio frame may include 10 subframes, and the first set of subframes may include subframe #0, subframe #4, subframe #5, and subframe #9.

In step S110, the BS communicates with the UE by using at least one of the first set of subframes and the second set of subframes.

Further, a beam direction of each of the plurality of cells may be divided multiple sectors in one TTI. Each of the plurality of cells may use different patterns of the beam direction to be orthogonal with each other.

Figure 15:
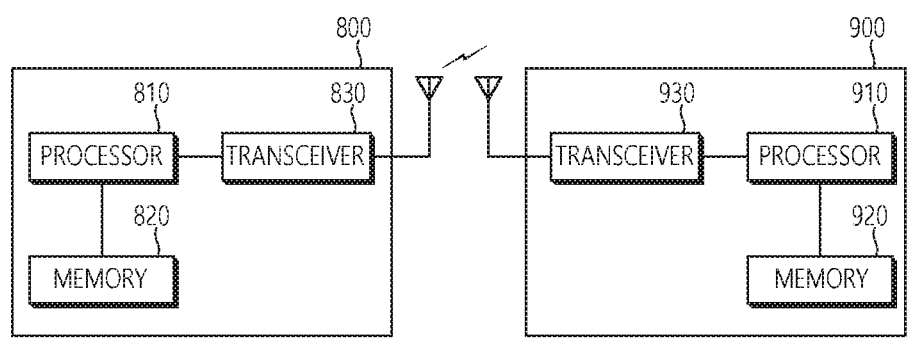
FIG. 15 shows a wireless communication system to implement an embodiment of the present invention.

FIG. 15 shows a wireless communication system to implement an embodiment of the present invention.

ABS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to an embodiment of the present invention, paired and unpaired spectrum can be utilized efficiently for 5G technology.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a first base station (BS) serving a first cell in a wireless communication system, the method comprising:
transmitting first information on an intended subframe type of the first cell to a second BS serving a second cell;
receiving second information on an intended subframe type of the second cell from the second BS;
configuring a first set of subframes and a second set of subframes in a radio frame of the first cell based on the second information,
wherein a subframe type of the first set of subframes is fixed among the first cell and the second cell, and a subframe type of the second set of subframes is dynamically adapted; and
communicating with a user equipment (UE) in at least one of the first set of subframes or the second set of subframes,
wherein the first BS and the second BS belong to different operators, and
wherein the different operators are synchronized with each other.

2. The method of claim 1, wherein the first cell and the second cell operate at a frequency below 6 GHz.

3. The method of claim 1, wherein the first cell and the second cell operate at a frequency above 6 GHz.

4. The method of claim 1, wherein the first set of subframes is indicated via system information or via a physical broadcast channel (PBCH).

5. The method of claim 1, wherein the radio frame includes 10 subframes, and
wherein the first set of subframes includes subframe #0, subframe #4, subframe #5, and subframe #9.

6. The method of claim 1, wherein a beam direction of each of the plurality of cells is divided into multiple sectors in one transmission time interval (TTI).

7. The method of claim 6, wherein each of the first cell and the second cell uses different patterns of the beam direction to be orthogonal with each other.

8. A first base station (BS) serving a first cell in a wireless communication system, the first BS comprising:
a memory;
a transceiver; and
a processor, coupled to the memory and the transceiver, that:
controls the transceiver to transmit first information on an intended subframe type of the first cell to a second BS serving a second cell,
controls the transceiver to receive second information on an intended subframe type of the second cell from the second BS,
configures a first set of subframes and a second set of subframes in a radio frame of the first cell based on the second information,
wherein a subframe type of the first set of subframes is fixed among the first cell and the second cell, and a subframe type of the second set of subframes is dynamically adapted, and
controls the transceiver to communicate with a user equipment (UE) in at least one of the first set of subframes or the second set of subframes,
wherein the first BS and the second BS belong to different operators, and
wherein the different operators are synchronized with each other.

9. The first BS of claim 8, wherein the first cell and the second cell operate at a frequency below 6 GHz.

10. The first BS of claim 8, wherein the first cell and the second cell operate at a frequency above 6 GHz.

11. The first BS of claim 8, wherein the first set of subframes is indicated via system information or via a physical broadcast channel (PBCH).

12. The first BS of claim 8, wherein the radio frame includes 10 subframes, and
wherein the first set of subframes includes subframe #0, subframe #4, subframe #5, and subframe #9.

13. The first BS of claim 8, wherein a beam direction of each of the first cell and the second cell is divided into multiple sectors in one transmission time interval (TTI).

14. The first BS of claim 13, wherein each of the first cell and the second cell uses different patterns of the beam direction to be orthogonal with each other.

* * * * *